Patented Aug. 15, 1944

2,355,850

UNITED STATES PATENT OFFICE 2,355,850

METHOD OF MAKING CHLOROBUTYL-BENZENE COMPOUNDS

Robert R. Dreisbach, Midland, Mich., assignor to The Dow Chemical Company, Midland, Mich., a corporation of Michigan No Drawing. Application June 20, 1942, Serial No. 447,874

13 Claims. (Cl. 260—651)

This invention concerns certain new chlorobutyl-benzene compounds having the general formula:

R—C₄H₉Cl 

wherein R represents an aromatic radical of the benzene series and a method of making the same. It particularly concerns a method whereby a chlorobutyl radical may be introduced as a substituent on the nucleus of benzene compounds.

The chlorobutyl-benzene compounds provided by the invention are colorless liquids which are useful as organic solvents and as plasticizers for synthetic resins, although they may in some instances be solids. The chlorine atom of the chlorobutyl radical in all such products is replaceable with other groups; hence the new compounds are particularly useful as chemical agents which may be employed in making derivatives thereof. For instance, chlorobutyl-benzene may be hydrolyzed to obtain phenyl-butyl alcohol, etc. Although a wide variety of chlorobutyl-benzene derivatives may be prepared in accordance with the present method, the invention pertains particularly to chlorobutyl-benzene derivatives having the general formula:

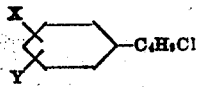

wherein X and Y each represents hydrogen, a halogen or an alkyl radical.

It is known that when ethylene chloride or propylene chloride is reacted with a benzene compound, e. g., benzene, toluene, xylene, chlorobenzene, or dichlorobenzene, etc., in the presence of a Friedel-Crafts catalyst both halogen atoms of the olefine chloride enter into the reaction with formation of products such as dibenzyl or 1,2-ditolylethane, etc., or higher boiling condensation products. Neither of the chlorine atoms of the olefin chloride are retained in the aliphatic radicals of the reaction products. Britton et al. in U. S. Patent No. 2,244,284 have reported that when 1,2-dichlorobutane is reacted with monochloro- or dichlorobenzene in the presence of a Friedel-Crafts catalyst at elevated temperatures, e. g., between 50° and 135° C., both halogens are displaced from the dichlorobutane and products such as 1,2-di-(chlorophenyl)-butane and higher boiling oily to resinous condensation products are obtained.

I have now found that when 1,2-dichlorobutane is reacted with a benzene compound in the presence of a Friedel-Crafts catalyst at a temperature of 30° C. or lower, one of the halogen atoms of the dichlorobutane is replaced far more readily than the other halogen atom, with the result that a considerable amount of a corresponding chlorobutyl benzene compound is formed. After completing the reaction, the mixture may, if desired, be warmed somewhat, e. g., to 40° C. or somewhat higher, without appreciable loss of the chlorobutyl aromatic product, but vigorous heating of the product together with the active Friedel-Crafts catalyst usually results in removal of the chlorine atom, e. g., as hydrogen chloride, from the chlorobutyl radical of the product.

Any benzene compound containing a labile hydrogen atom in its nucleus and capable of entering into a Friedel-Crafts reaction with an alkyl chloride may be employed as an aromatic reactant in the process. Examples of such aromatic reactants are benzene, toluene, ethylbenzene, isopropylbenzene, n- or sec.-butylbenzene, xylene, diethylbenzene, mesitylene, chlorobenzene, ortho-dichlorobenzene, meta-dichlorobenzene, para-dichlorobenzene, bromobenzene, a dibromobenzene, methyl-chlorobenzene, ethyl-chlorobenzene, butyl-chlorobenzene, ethyl-bromobenzene, etc. A benzene compound containing not more than two nuclear substituents, e. g., one having the general formula:

wherein X and Y each represents hydrogen, a halogen, or an alkyl radical, is preferably employed as the aromatic reactant. Between 0.5 and 2.5 molecular equivalents of the aromatic reactant are usually employed per mole of the 1,3-dichlorobutane, but the aromatic reactant may be employed in smaller or in considerably larger proportions if desired.

Any catalyst for Friedel-Crafts reactions which is sufficiently active to effect the reaction between 1,2-dichlorobutane and the aromatic reactant at temperatures below 30° C. may be employed in the process. Examples of such catalysts are aluminum chloride, aluminum bromide, boron trifluoride, mixtures of aluminum chloride and ferric chloride, etc. An aluminum halide, preferably aluminum chloride, is usually employed. Although the proportion of catalyst to be used in the process may be varied widely and the optimum proportion is dependent upon the particular catalyst and aromatic reactant employed, the catalyst is advantageously used in a proportion not greatly exceeding that required to promote smooth and fairly rapid reaction at the low temperatures required. When using aluminum chloride as the catalyst, it is usually employed in amount corresponding to between 0.01 and 0.2 molecular equivalent of AlCl$_3$ per mole of the 1.2-dichlorobutane.

It is important that the reaction be carried out at a moderate temperature, e. g., 30° C. or lower, since at elevated temperatures both chlorine atoms of the 1.2-dichlorobutane react and the desired product is not obtained. In practice the reaction is carried nearly to completion at room temperature or lower, preferably at temperatures between 0° and 20° C., although toward the close of the reaction the mixture may be warmed mildly, e. g., to temperatures not greatly in excess of 40° C., in order to further the reaction. The reaction is usually continued until the evolution of hydrogen chloride from the mixture has subsided, but it may be stopped short of this point if desired. After completing the reaction, the catalyst is removed or rendered inactive in any of the usual ways, e. g., by washing the mixture with water or an aqueous solution of an acid or a strong alkali, and the chlorobutyl aromatic product is separated, e. g., by distillation.

The following examples describe certain ways in which the principle of the invention has been applied, but are not to be construed as limiting the invention.

Example 1

Twenty grams of aluminum chloride was added in small portions over a period of 1.5 hours to a mixture of 297 grams (3.8 moles) of benzene and 387.5 grams (3.05 moles) of 1.2-dichlorobutane, while continuously stirring the mixture and maintaining it at temperatures between 2° and 5° C. by external cooling. After adding the aluminum chloride, stirring was continued for 7 hours, during which period the mixture was permitted to come to room temperature. The mixture was then permitted to stand for 8 hours, by the end of which period the evolution of hydrogen chloride from the mixture had subsided, indicating that the reaction was substantially complete. The mixture was washed successively with water, a dilute aqueous sodium hydroxide solution and again with water, after which it was dried and fractionally distilled. The following fractions of distillate were obtained:

| Fraction No. | Distilling temperature °C. at mm. absolute pressure | Weight in grams |
| --- | --- | --- |
| 1 | 30°–46° C. at 150 mm | 119 |
| 2 | 46° C./150 mm to 41° C./25 mm | 158 |
| 3 | 38°–65° C. at 1 mm | 52 |
| 4 | 65°–67° C. at 1 mm | 68 |
| 5 | 67°–140° C. at 1 mm | 26 |
| 6 | 140°–216° C. at 1 mm | 29 |

Fraction 1 of the distillate was found to consist largely of unreacted benzene; fraction 2 contained approximately 52 grams of benzene and 106 grams (0.83 mole) of unreacted 1.2-dichlorobutane; fractions 3 and 5 each contained approximately 90 per cent by weight of chlorobutylbenzene; fraction 4 was chlorobutyl-benzene; and fraction 6 contained higher boiling products, including presumably diphenyl butane. The yield of chlorobutyl-benzene was approximately 37 per cent of theoretical, based on the 1.2-dichlorobutane consumed. The chlorobutyl-benzene product is a colorless liquid which boils at approximately 230°–231° C. at 760 millimeters pressure and possesses a specific gravity of approximately 1.023 at 25° C. with respect to water at the same temperature.

Example 2

I have also prepared chlorobutyl-chlorobenzene by gradually adding 7 grams of aluminum chloride to a mixture of 56 grams (0.5 mole) of chlorobenzene and 63.5 grams (0.5 mole) of 1.2-dichlorobutane with stirring, permitting the resultant reaction mixture to stand over night, and separating the product as in Example 1. The chlorobutyl-chlorobenzene product was a colorless liquid having a specific gravity of approximately 1.149 at 25° C.

The method herein described may be applied in making other chlorobutyl-benzene compounds. For instance, it may be applied in reacting 1.2-dichlorobutane with orthodichlorobenzene to form chlorobutyl-dichlorobenzene; with toluene to form chlorobutyl-toluene; or with ethylchlorobenzene to form chlorobutyl-ethyl-chlorobenzene, etc.

In the claims, where it is specified that the catalyst be removed, it will be understood that the removal may be effected in any of the usual ways hereinbefore mentioned, e. g., the reaction mixture may be treated with an agent for deactivating, and thus destroying, the catalyst, or the latter may be separated from the reaction product by washing the reaction mixture with water or an aqueous solution of an acid or of an alkali, etc.

Other modes of applying the principle of the invention may be employed instead of those explained, change being made as regards the method herein disclosed, provided that the step or steps stated by any of the following claims or the equivalent of such stated step or steps be employed.

I therefore particularly point out and distinctly claim as my invention:

1. In a method wherein 1.2-dichlorobutane is reacted with an aromatic compound of the benzene series in the presence of a Friedel-Crafts catalyst, the steps of carrying out the reaction and subsequently removing the catalyst at a temperature below 30° C., whereby a chlorobutyl radical is introduced as a substituent on the nucleus of the aromatic compound.

2. The method which comprises reacting 1.2-dichlorobutane with an aromatic compound of the benzene series at temperatures below 30° C. in the presence of an aluminum halide-containing catalyst, whereby a derivative of the aromatic compound containing a chlorobutyl radical as a nuclear substituent is formed, and removing the catalyst while maintaining the reaction mixture at a temperature below 30° C.

3. The method which comprises reacting 1.2-dichlorobutane with an aromatic compound of the benzene series in the presence of an aluminum chloride-containing catalyst at temperatures which are below 30° C. and which in the earlier stages of the reaction are below room temperature, whereby a derivative of the aromatic compound containing a chlorobutyl radical as a nuclear substituent is formed, and removing the catalyst while maintaining the reaction mixture at a temperature below 30° C.

4. In a method wherein 1.2-dichlorobutane is reacted with an aromatic compound of the benzene series in the presence of an aluminum chloride-containing catalyst, the improvements which consist in carrying the reaction out at temperatures below 30° C., employing between 0.5 and 2.5 molecular equivalents of the aromatic reactant per mole of the 1.2-dichlorobutane, and employing the aluminum chloride in a proportion not greatly exceeding that required to cause the reaction, whereby a derivative of the aromatic compound containing a chlorobutyl radical as a nuclear substituent is formed, and removing the catalyst while maintaining the reaction mixture at a temperature below 30° C.

5. The method which comprises reacting 1.2-dichlorobutane with an aromatic compound having the general formula:

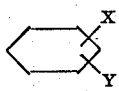

wherein X and Y each represents a member of the group consisting of hydrogen, halogens, and alkyl radicals, at a temperature below 30° C. in the presence of a Friedel-Crafts catalyst, whereby a derivative of the aromatic compound containing a chlorobutyl radical as a nuclear substituent is formed, and removing the catalyst while maintaining the reaction mixture at a temperature below 30° C.

6. The method which comprises reacting 1.2-dichlorobutane with an aromatic compound having the general formula:

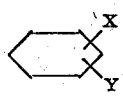

wherein X and Y each represents a member of the group consisting of hydrogen, halogens, and alkyl radicals, at temperatures below 30° C. in the presence of an aluminum chloride-containing catalyst, whereby a derivative of the aromatic compound containing a chlorobutyl radical as a nuclear substituent is formed, removing the catalyst from the reaction mixture while the latter is at a temperature below 30° C., and separating the chlorobutyl-aromatic product from the mixture.

7. In a method of making chlorobutyl-benzene, the steps which consist in reacting 1.2-dichlorobutane with benzene in the presence of a Friedel-Crafts catalyst at temperatures below 30° C. and removing the catalyst while the reaction mixture is at a temperature below 30° C.

8. In a method for making chlorobutyl-benzene, the steps which consist in reacting 1.2-dichlorobutane with benzene in the presence of an aluminum halide-containing catalyst, the reaction being carried out at temperatures below 30° C. and being initiated at below room temperature and after completing the reaction, removing the catalyst without heating the mixture to a temperature appreciably higher than 30° C.

9. In a method for making chlorobutyl-benzene, the steps which consist in reacting 1.2-dichlorobutane with benzene in the presence of a catalytic amount of aluminum chloride, the reaction being carried out at temperatures below 30° C. and being initiated at below room temperature and the benzene being employed in amount corresponding to between 0.5 and 2.5 times the molecular equivalent of the 1.2-dichlorobutane, removing the catalyst while the mixture is at a temperature below 30° C., and separating the chlorobutyl-benzene product from the mixture.

10. In a method for making chlorobutyl-chlorobenzene, the steps which consist in reacting 1.2-dichlorobutane with chlorobenzene in the presence of a Friedel-Crafts catalyst at temperatures below 30° C. and removing the catalyst while the reaction mixture is at a temperature below 30° C.

11. In a method for making chlorobutyl-chlorobenzene, the steps which consist in reacting 1.2-dichlorobutane with chlorobenzene in the presence of an aluminum halide-containing catalyst, the reaction being carried out at temperatures below 30° C. and being initiated at below room temperature and after completing the reaction, removing the catalyst without heating the mixture to a temperature appreciably higher than 30° C.

12. In a method for making chlorobutyl-chlorobenzene, the steps which consist in reacting 1.2-dichlorobutane with chlorobenzene in the presence of an aluminum chloride containing catalyst, the chlorobenzene being employed in amount corresponding to between 0.5 and 2.5 times the molecular equivalent of the 1.2-dichlorobutane and the reaction being carried out at temperatures below 30° C. and being initiated at below room temperature, after carrying out the reaction, removing the catalyst while the reaction mixture is at a temperature below 30° C., and separating the chlorobutyl-chlorobenzene product from the mixture.

13. In a method wherein 1.2-dichlorobutane is reacted with an aromatic compound of the benzene series in the presence of a Friedel-Crafts catalyst, the steps of carrying out the reaction at a temperature below 30° C., whereby a chlorobutyl radical is introduced as a substituent on the nucleus of the aromatic compound, and removing the catalyst without heating the mixture to a temperature appreciably higher than 40° C.

ROBERT R. DREISBACH.